(12) United States Patent
Drube et al.

(10) Patent No.: US 11,435,034 B1
(45) Date of Patent: Sep. 6, 2022

(54) TANK SYSTEMS WITH AN INSULATION ASSEMBLY

(71) Applicant: Chart Inc., Ball Ground, GA (US)

(72) Inventors: Thomas Drube, Lakeville, MN (US); Lyle Holsinger, Ball Ground, GA (US)

(73) Assignee: Chart Inc., Ball Ground, GA (US)

( * ) Notice: Subject to any disclaimer, the term of this patent is extended or adjusted under 35 U.S.C. 154(b) by 390 days.

(21) Appl. No.: 16/029,116

(22) Filed: Jul. 6, 2018

Related U.S. Application Data

(60) Provisional application No. 62/529,113, filed on Jul. 6, 2017.

(51) Int. Cl.
| | |
|---|---|
| F17C 13/00 | (2006.01) |
| F17C 1/12 | (2006.01) |
| F17C 3/08 | (2006.01) |
| F17C 3/06 | (2006.01) |

(52) U.S. Cl.
CPC .............. *F17C 13/001* (2013.01); *F17C 1/12* (2013.01); *F17C 3/06* (2013.01); *F17C 3/08* (2013.01); *F17C 2201/0109* (2013.01); *F17C 2203/0325* (2013.01); *F17C 2203/0341* (2013.01); *F17C 2203/0391* (2013.01); *F17C 2203/0629* (2013.01); *F17C 2203/0636* (2013.01); *F17C 2203/0685* (2013.01); *F17C 2221/033* (2013.01); *F17C 2223/0161* (2013.01); *F17C 2270/01* (2013.01)

(58) Field of Classification Search
CPC ...... F17C 2203/0621; F17C 2203/0391; F17C 2203/0636; F17C 2203/0685; F17C 2203/0325; F17C 2203/0341; F17C 2203/0337; F17C 2203/0345; F17C 2203/035

See application file for complete search history.

(56) References Cited

U.S. PATENT DOCUMENTS

| | | | | |
|---|---|---|---|---|
| 3,101,861 | A | * | 8/1963 | Mearns, III et al. ... B63B 25/16 220/560.08 |
| 3,149,742 | A | * | 9/1964 | Hay ...................... F17C 13/001 220/560.13 |
| 5,386,706 | A | * | 2/1995 | Bergsten ................. C04B 30/00 62/45.1 |
| 5,542,255 | A | * | 8/1996 | Preston ............. B29C 45/14549 220/901 |
| 5,590,054 | A | * | 12/1996 | McIntosh .............. F16L 59/065 702/172 |
| 2017/0254481 | A1 | * | 9/2017 | Cadogan .................. F17C 3/08 |

* cited by examiner

*Primary Examiner* — James N Smalley
*Assistant Examiner* — Jennifer Castriotta
(74) *Attorney, Agent, or Firm* — Cook Alex Ltd.

(57) ABSTRACT

A storage tank system features a tank made of rigid material and an insulation assembly. The insulation assembly includes an inner membrane and an outer membrane wherein the inner membrane is located within the outer membrane and at least one of the inner membrane and outer membrane is made of a flexible material. An insulation medium is located in a space between the inner membrane and the outer membrane and a vacuum is applied to the space.

3 Claims, 10 Drawing Sheets

TANK SYSTEMS WITH AN INSULATION ASSEMBLY

RELATED APPLICATIONS

The present application claims the benefit of and priority to U.S. Provisional Patent Application No. 62/529,113, file Jul. 6, 2017, which is hereby incorporated herein by reference.

FIELD OF DISCLOSURE

The present application is directed to insulation assemblies, and more particularly, to tank systems that include insulation assemblies wherein the tank system is used to store liquid, such cryogenic liquid. Even more particularly, the present application is directed to tank assemblies wherein the insulation assembly is load or pressure bearing and has a relatively high compressive strength.

BACKGROUND

Storage container equipment may be used to store, transport and distribute varies types of fluids, such any number of liquids. Storage containers for cryogenic liquids, such as liquefied natural gas, may be constructed with an inner pressure vessel that is surrounded by an outer vacuum jacket or vessel, which contains the inner pressure vessel. The inner and outer pressure vessels are made from rigid materials, such as metals. There is an annular space positioned between the inner pressure vessel and the surrounding outer jacket. In use, the annular space contains insulating mediums with a vacuum being established in the annular space. Accordingly, the inner vessel is suspended within the outer jacket for thermal insulation.

The outer vacuum jacket structurally supports the inner vessel and also bears an external pressure, which is created by the vacuum within the annular space. This type of construction allows for the annular space to be engineered so that there is a controlled space for the insulation mediums. Since the outer jacket supports structural loads, there are no significant loads on the insulation medium itself. In practice there are two load bearing containers in the aforementioned configuration, the inner pressure vessel and the outer vacuum jacket.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a storage tank system includes a tank made of rigid material and an insulation assembly. The insulation assembly includes an inner membrane and an outer membrane, wherein the inner membrane is located within the outer membrane, and at least one of the inner membrane and outer membrane are made of a flexible material. An insulation medium is located in a space between the inner membrane and the outer membrane. A vacuum is applied to the space between the inner membrane and the outer membrane.

In another aspect, a storage tank system includes a tank made of rigid material. A flexible membrane is spaced from a wall of the tank. An insulation medium is located in a space between the membrane and the wall of the tank. A vacuum is applied to the space between the membrane and the wall of the tank.

DETAILED DESCRIPTION

Before the present subject matter is further described, it is to be understood that this subject matter described herein is not limited to particular embodiments described, as such may of course vary. It is also to be understood that the terminology used herein is for the purpose of describing a particular embodiment or embodiments only, and is not intended to be limiting. Unless defined otherwise, all technical terms used herein have the same meaning as commonly understood by one skilled in the art to which this subject matter belongs.

Figure 1:
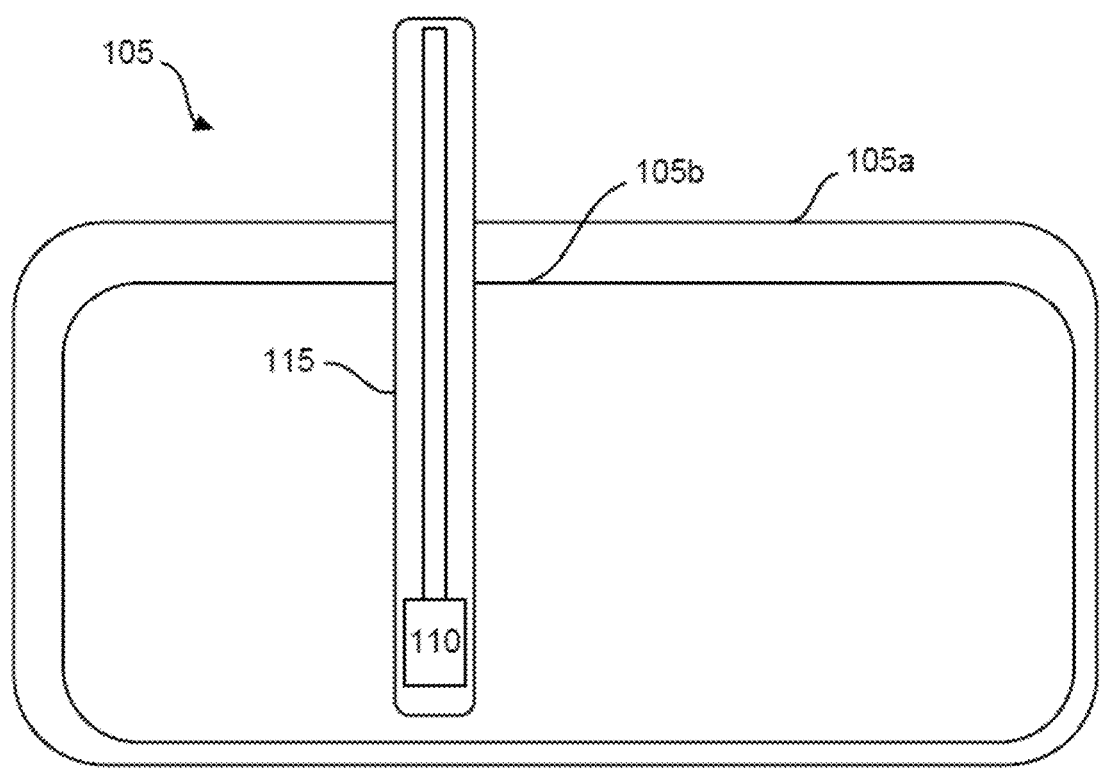
FIG. 1 shows a schematic representation of a tank system that contains a fluid, such as liquid natural gas and a fuel pump.

FIG. 1 shows a schematic representation of storage tank assembly 105, which may be used to store, transport and/or distribute any number of fluids. Such as fuels, liquids for consumption (drinks), industrial chemicals, etc. In one embodiment, the storage tank assembly 105 may contain a fluid, such as a cryogenic liquid which may be liquid natural gas (LNG). The storage tank assembly 105 may be formed of an outer tank, vessel or container 105*a* (or outer jacket) in which is nested an inner tank, vessel or container 105*b* (or inner pressure vessel) in a vacuum-sealed manner such that a vacuum space exists between the inner and outer tanks. The vacuum space is an annular space in which an insulating medium can be positioned, as described more fully below.

In a non-limiting example, a fluid pump 110 is positioned inside the inner tank 105*b* for pumping the contents of the tank to a use device such as via one or more fluid conduits (not shown) that connect the tank 105 to the use device (not shown). Further to the non-limiting example, a pump column 115 can positioned inside the tank 105 such that the pump column 115 extends from an upper region of the tank 105 downwardly to the pump 110. The pump column, as well as the tank itself, may vary in structure.

As described in detail below, the inner pressure vessel 105b can be at least partially formed of an internal and flexible or pliable material, such as the flexible membranes of the insulation assembly described below. The insulating medium inside the annular space is leveraged to allow the inner pressure vessel 105b to be the singular load bearing structure for the entire tank. For example, the ability of the insulation medium to increase in compressive strength and/or define a ridge structure when the medium is in or subject to a vacuum allows the pressure vessel to be the load or pressure bearing structure of the system. This permits a reduction or minimization of the outer vacuum jacket 105a so as to reduce the weight, complexity and potentially the overall cost of the storage tank system.

In accordance with the above, an insulating medium is positioned within the vacuum space, with the insulating medium having low temperature thermal conductivity properties, being stable under a vacuum, and being able to flow to a useful degree, allowing it to be practically placed into a lining. The insulating medium also has a useful structural compressive strength. Some example materials that exhibit at least some of the aforementioned properties may include insulation particles or beads. Such materials include, but are not limited to, perlite, glass marbles, glass bubbles and certain aerogels.

In one example of an insulation medium, when a collective amount of the insulation medium is loose and/or not under a vacuum, the material may easily flow so as to allow the amount to be placed in a desired location. Additionally, while not under a vacuum, the collective material has a relatively very low compressive strength. When the collective amount of insulation medium is under or in a vacuum, the insulation medium becomes tightly packed and the collective material, under a vacuum, greatly increases in compressive strength such that it has a relatively very high compressive strength. As will be shown below, these characteristics of the insulation medium allow the material to be placed in a particular location and then placed under a vacuum to define a structure having a relatively high compressive strength.

Figure 2:
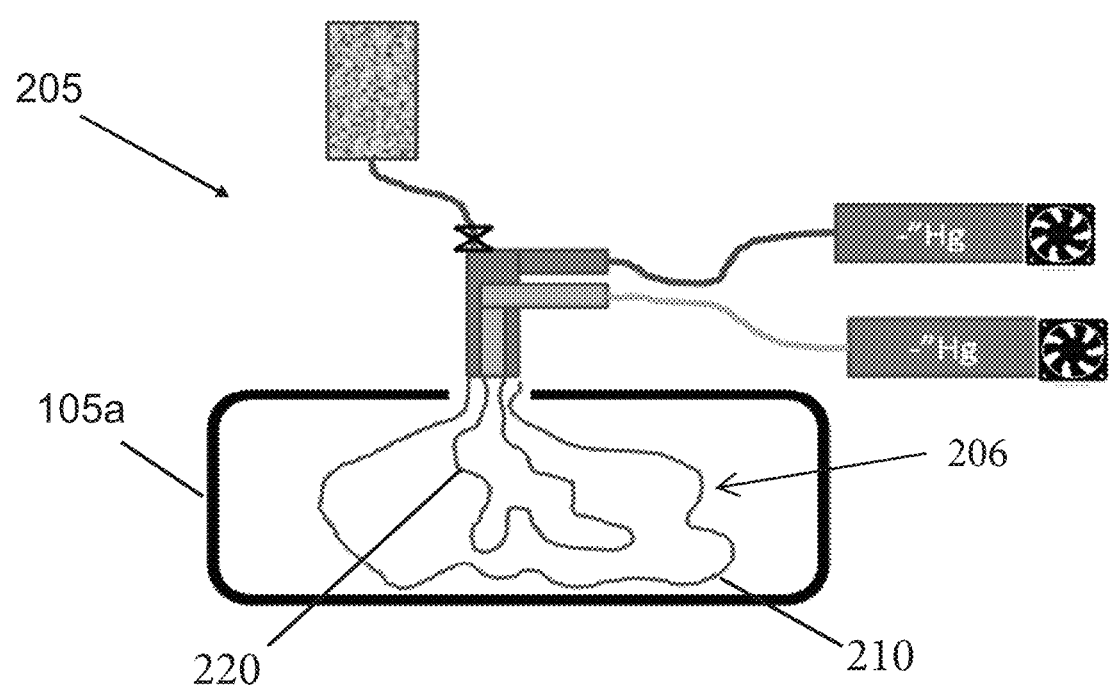
FIG. 2 shows an initial step in an exemplary method of manufacturing a tank system.

There is now described an example method of forming a tank system. With reference to FIG. 2, an outer tank 105a is provided with the outer tank being made from a rigid material, such as steel. An installation device 205 is connected or otherwise coupled to an opening or conduit of the vacuum jacket 105a for installing an insulation assembly that may include inner and outer membranes, as well as insulation medium. The installation device 205 includes conduits for inserting the membranes into an internal cavity of the outer tank 105a. The installation device 205 also includes one or more devices that permit or otherwise enable pressurization of the internal cavity of the outer tank 105a. In a first step, the inside of the outer tank 105a can be surveyed, scanned, or otherwise measured, such as by using a laser. The insulation assembly 206 includes a pair of membranes, including an outer membrane 210 and inner membrane 220 that are inserted into the outer tank 105a through an access port in the outer tank 105a. The membranes can be flexible, bag like structures that are generally floppy in a default state and that can obtain a desired shape upon being internally pressurized. Such membranes may be for example, MYLAR. In alternative embodiments, one of the inner and outer members may be made from a metal.

Figure 3:
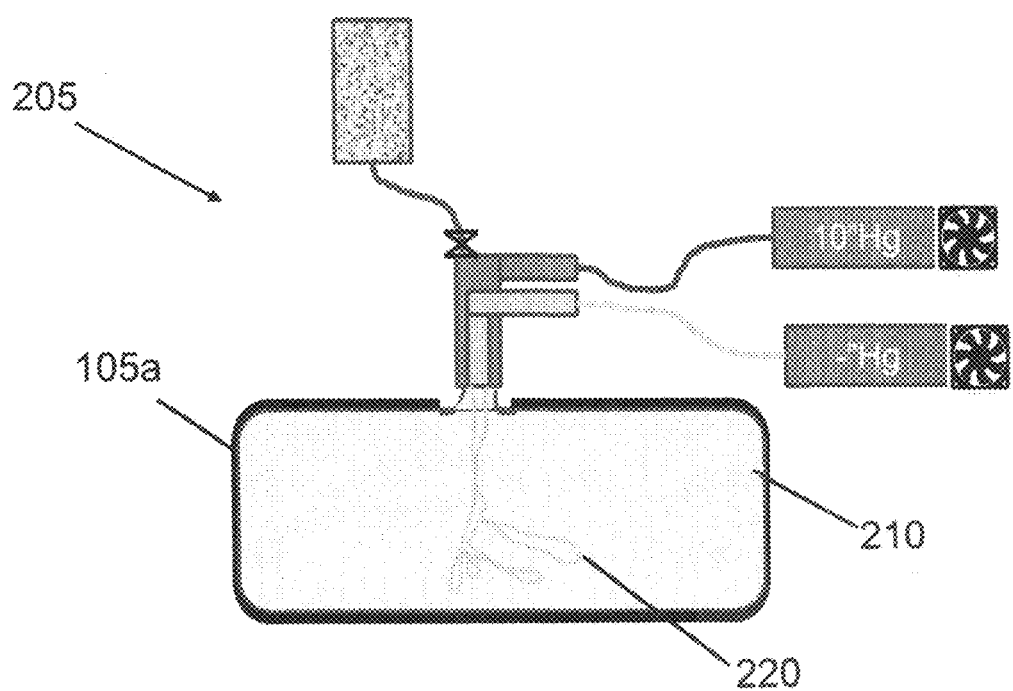
FIG. 3 shows an additional step in an exemplary method of manufacturing a tank system.

With reference now to FIG. 3, the outer membrane 210 is pressed into place within the outer tank 105a, such as by internally pressurizing the outer membrane 210 using a conduit and a pressure device (such as a pump) of the device 205. In this manner, the outer membrane 21Q expands to a desired shape that may conform, for example, to the internal shape defined by the walls of the outer tank 105a.

Figure 4:
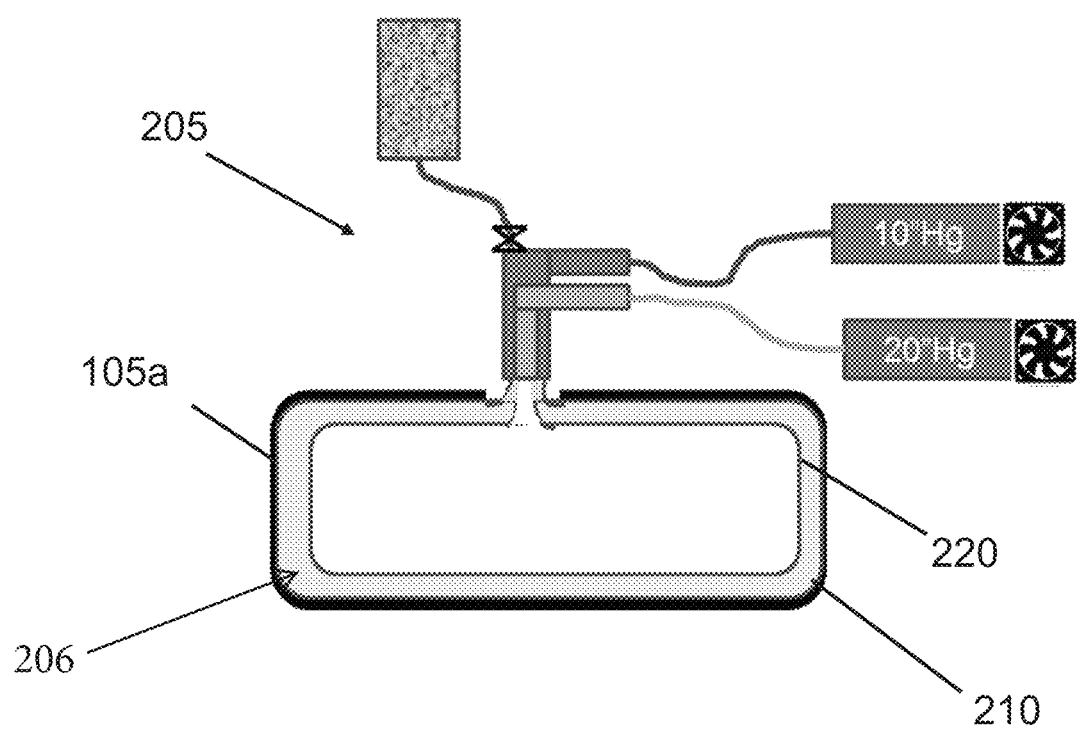
FIG. 4 shows an additional step in an exemplary method of manufacturing a tank system.

Next, with reference to FIG. 4, the inner membrane 220 is expanded by internally pressurizing the inner membrane 220 using a conduit and a pressure device of the device 205. There is now an annular space between the inner membrane 220 and the outer membrane 210 with both the inner membrane 220 and the outer membrane 210 being an expanded state due to the pressurization provided by the device 205.

Figure 5:
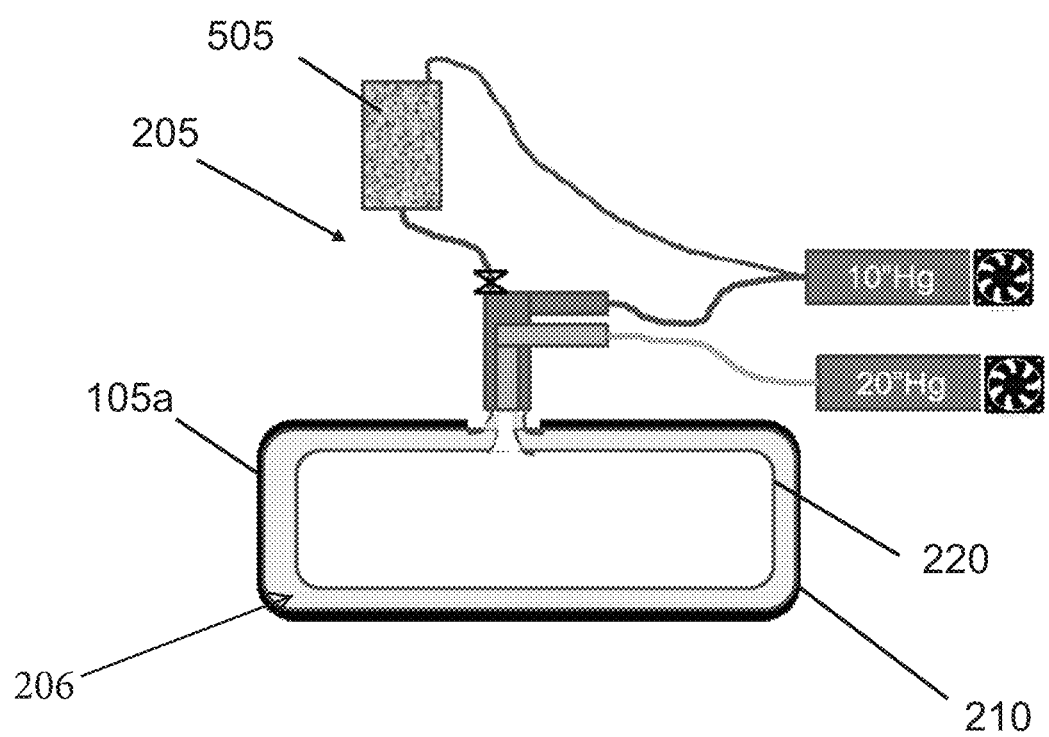
FIG. 5 shows an additional step in an exemplary method of manufacturing a tank system.
Figure 6:
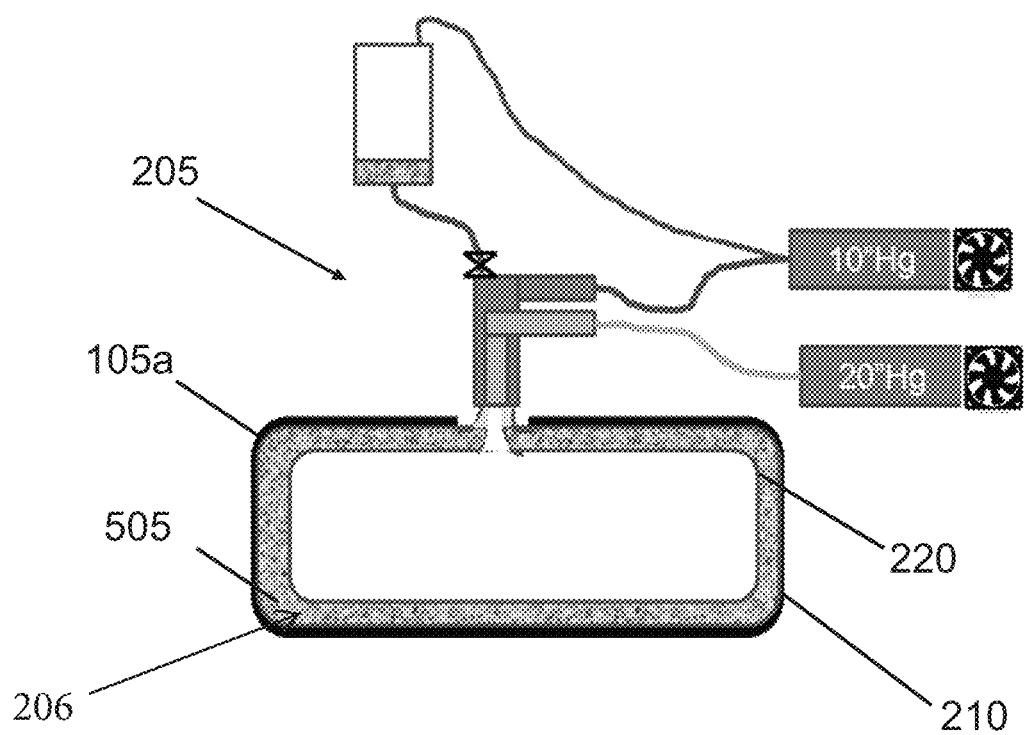
FIG. 6 shows an additional step in an exemplary method of manufacturing a tank system.

With reference now to FIG. 5, the device 205 also includes a supply of insulation medium 505 that can be pumped into the annular space between the inner membrane 220 and the outer membrane 210. The insulation medium 505 can be pressurized to the same pressure as the annular space. The insulation medium 505 can be pressurized so that it flows into the annular space (i.e., the cavity between the inner and outer membrane) in between the inner membrane 220 and the outer membrane 210, as shown in FIG. 6. The collective insulation medium, at this point, may flow easily and has a low compressive strength.

Figure 7:
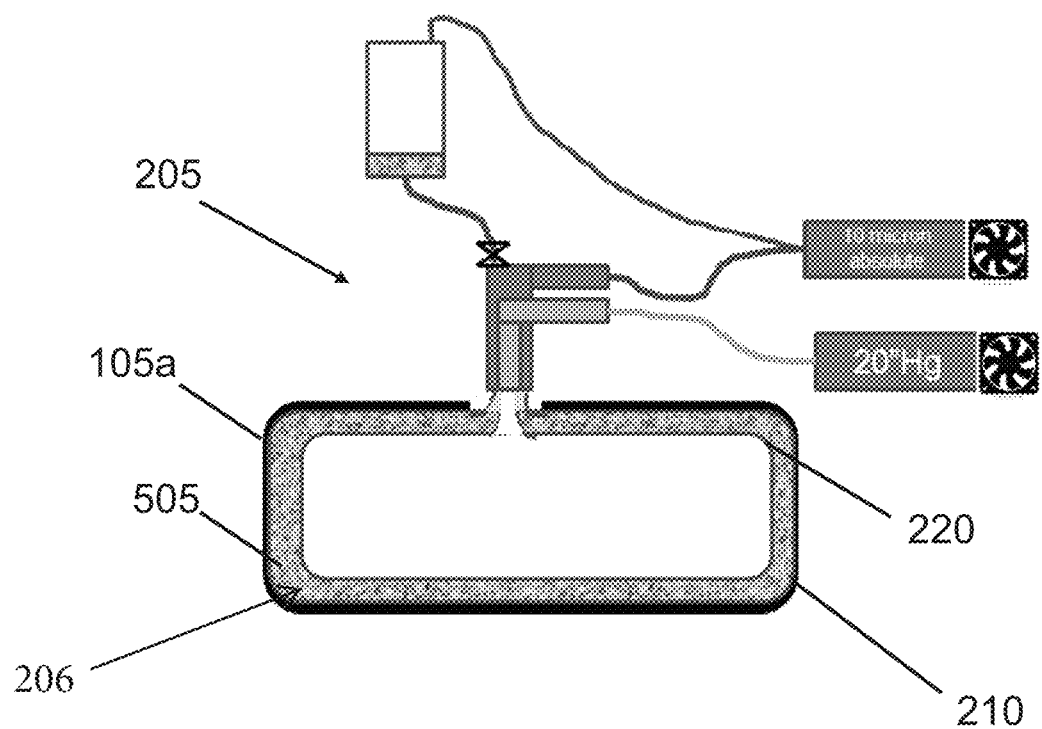
FIG. 7 shows an additional step in an exemplary method of manufacturing a tank system.
Figure 8:
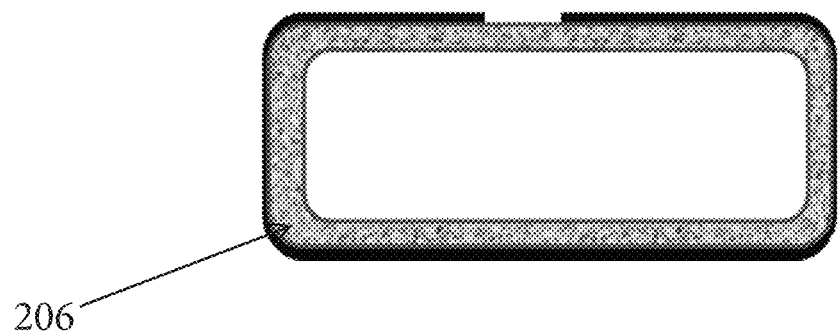
FIG. 8 shows an additional step in an exemplary method of manufacturing a tank system.

In a next step, shown in FIG. 7, the pressure within the annular space is reversed and pulled to a high vacuum. This causes the inner and outer membranes (which are essentially a "bag within a bag") to create a self-supporting structure, which in this embodiment defines a space for containing a liquid, such as any of those discussed above. The insulation medium (which may be for example any of the insulation medium described above), at this point, has a relatively high compressive strength. Thus, the insulation assembly 206 has a relative high compressive strength and the insulation assembly may transfer pressure close to the outer tank without crushing. The inner and outer membranes can be configured to expand, such as by using pleats within the inner and outer membranes so that they are compliant to the structure of the outer vessel. The device 205 can then be removed from the tank, as shown in FIG. 8.

In an embodiment, as described above with reference to FIGS. 2-8, the inside space of a container is surveyed by laser. The shape of the tank or container is surveyed to create a dual set of flexible membranes made of a suitable material, such as Mylar or other material that is stable at cryogenic temperatures and vacuum impermeable. A larger set of membrane is mapped to the inside surface of the tank, and a smaller set of membrane is sized and shaped to create a gap between the membranes for the insertion of the insulation medium. With the use of blowers and vacuum systems, the larger membrane is forced into position inside the container. The smaller membrane is then inserted. The space between the membranes has the insulation medium poured in and then a vacuum is established. Notably, this process allows a cryogenic insulation to be placed inside almost any shape. The load bearing capacity of that shape may dictate the pressure capacity of the container since the membrane relies on the container for structural support.

Figure 9:
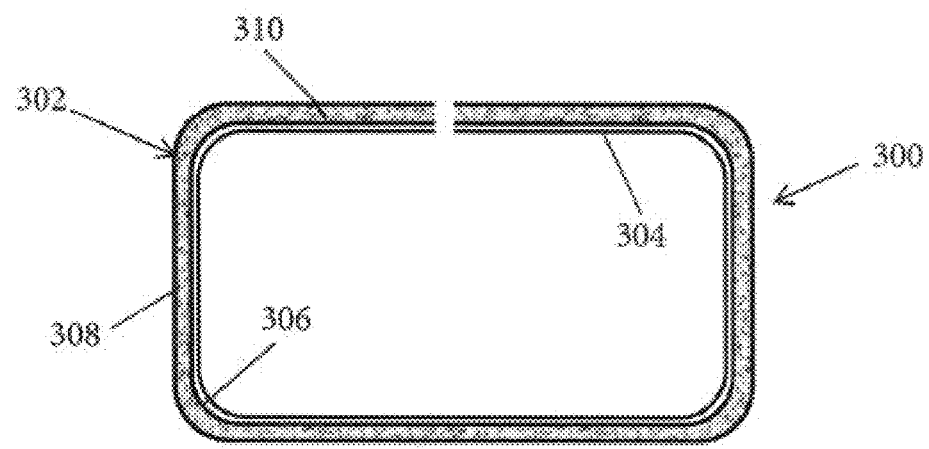
FIG. 9 shows a schematic representation of another an embodiment of a tank system, in accordance with the present disclosure.

FIG. 9 illustrates another embodiment of a storage tank system 300 in which the insulation assembly 302 is located outside of the tank 304. Similar to the previous embodiment, the insulation assembly 302 includes an inner membrane 306 and an outer membrane 308. At least one of the inner and outer membranes 306 and 308 is made from a flexible or pliable material. Additionally, one of the inner and outer membranes 306 and 308 may be made from a rigid material, such as a metal. In this embodiment, the inner membrane 306 is in contact with the wall of the tank 304 and the inner membrane may confirm to the shape of the tank 304. Once the membranes are in place, the insulating medium 310 can be flowed or "poured" into the space between the membranes. Once the space between the membranes is filled, a vacuum can be established on the space.

Figure 10:
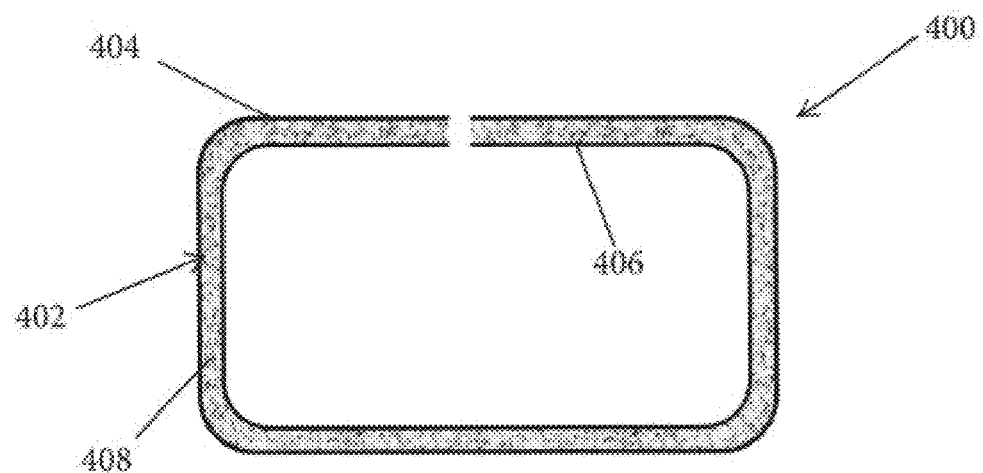
FIG. 10 shows a schematic representation of another an embodiment of a tank system, in accordance with the present disclosure.

FIG. 10 illustrates another embodiment of a storage tank system 400. In this embodiment the insulation assembly 402 is at least partial defined by the wall of the tank 404, which may be made of metal. An internal membrane 406 is configured inside a tank 404. The internal membrane 406 is smaller than the tank so as to form an engineered space between the internal tank wall and the membrane inside the tank. The insulating medium 408 can be flowed or "poured" into the space. Once the space is filled, a vacuum can be established on the space. The insulation medium 408 is configured to transfer the load from the pressure of the containing fluid to the tank wall. The membrane 406 can be properly pleated to permit the membrane 406 to be malleable and accommodate the thermal contraction of the membrane. This can also ensure that the membrane does not bear tension that would rupture the membrane. Furthermore, the tank 404 may be made from a metal and the internal membrane 406 may be made of a flexible material. Thus, the insulation assembly 402 includes an inner membrane 406 made of flexible material and an outer membrane defined by the metal wall of the tank 404.

The aforementioned configuration has an advantage of leaving the pressure vessel in a position to have structural supports added to it for mounting to saddles or other structures. The membrane isolates the vessel and supports from the cold fluid. It also puts the potentially thin membrane inside the tank where risk of puncture small or eliminated.

Figure 11:
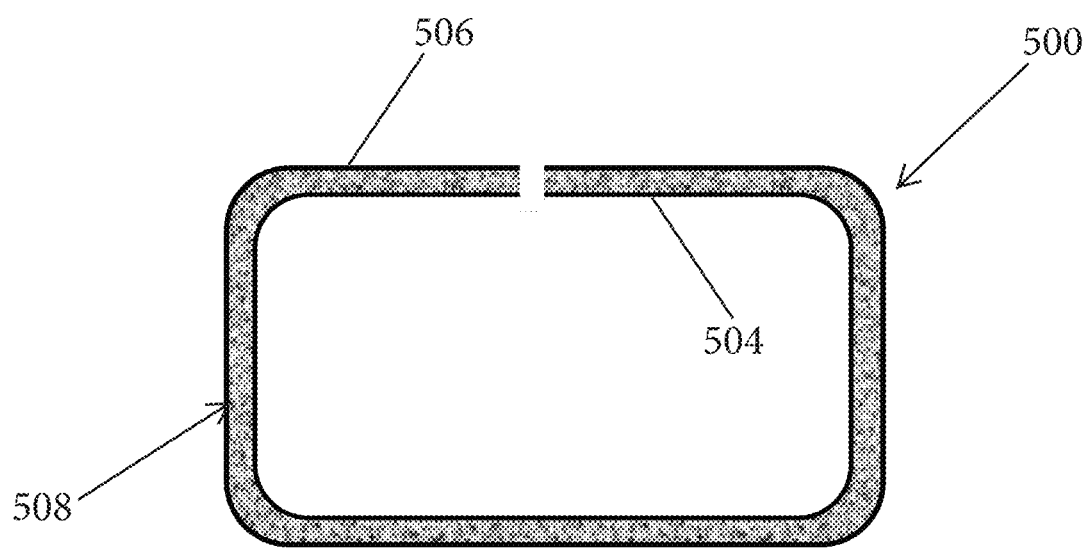
FIG. 11 shows a schematic representation of another an embodiment of a tank system, in accordance with the present disclosure.

FIG. 11 illustrates another embodiment of a storage tank system 500. In this embodiment the insulation assembly 502 is at least partial defined by the wall of the tank 504, which may be made of metal. An insulation membrane 506 is used on the outside of the tank 504. The membrane 506 is larger than the tank thereby creating a space for insulation medium 508 within a space between the insulation membrane and the tank 504. The insulation medium 508 is poured into this space and a vacuum is established. The membrane 506 can be pleated to accommodate any contraction of the tank and ensure that the vacuum pressure does not create tension on the membrane. The insulation medium transfers the vacuum load to the outside surface of the tank wall. This requires less load bearing capacity than the membrane since it is vacuum load only and not inner tank fluid pressure loading through the insulation. In a fire case, the insulation cladding does protect the pressure tank wall for the fire temperature. The membrane is subject to external loads and the strength of the membrane would need to consider credible impingement and potentials for rupture. Furthermore, the tank 504 may be made from a metal and the external membrane 506 may be made of a flexible material. Thus, the insulation assembly 502 includes a membrane 506 made of flexible material and an outer membrane defined by the metal wall of the tank 504.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A storage tank system, comprising:
a tank made of rigid material and having walls defining an internal shape of the tank;
an insulation assembly, comprising:
an inner membrane and an outer membrane wherein the inner membrane is located within the outer membrane, with the inner membrane and outer membrane each being made of a flexible material and the outer membrane of the insulation assembly contacting the walls of the tank and conforming to the internal shape defined thereby;
an insulation medium including particles or beads being located in a space between the inner membrane and the outer membrane; and
a vacuum applied to the space between the inner membrane and the outer membrane, wherein the vacuum results in the particles or beads becoming tightly packed between the inner membrane and the outer membrane so that the insulation medium has an increased compressive strength, the insulation assembly has an increased rigidity and the insulation assembly defines a load or pressure bearing vessel.

2. The storage tank system of claim 1 wherein the insulation medium comprises one or more of perlite, glass marbles, glass bubbles and/or aerogels.

3. The storage tank system of claim 1 wherein the system comprises a cryogenic liquid storage tank system.

* * * * *